United States Patent [19]
Wong

[11] 3,945,672
[45] Mar. 23, 1976

[54] IMPACT BRAKING DEVICE
[76] Inventor: Ngew-Yee Wong, 1532 N. Boylston St., Los Angeles, Calif. 90012
[22] Filed: Jan. 6, 1975
[21] Appl. No.: 538,731

[52] U.S. Cl. .................................. 293/5; 180/92
[51] Int. Cl.² .................................. B60R 19/02
[58] Field of Search .................. 293/2, 5, 6, 69, 85; 180/92, 94, 95; 188/106 R

[56] References Cited
UNITED STATES PATENTS

| | | | |
|---|---|---|---|
| 1,123,538 | 1/1915 | Imamura | 180/95 |
| 1,132,665 | 3/1915 | Manly | 293/2 |
| 2,001,093 | 5/1935 | Cherpes et al. | 293/85 X |
| 3,195,674 | 7/1965 | Schmidt | 180/92 |

Primary Examiner—John J. Love

[57] ABSTRACT

An impact braking device adapted for use with the standard braking systems provided in motor vehicles, the device comprising a slidable bumper operably attached to the vehicle frame structure by an actuator means, wherein at least one actuator is provided with a releasable locking lug. A brake cable is releasably attached to the standard vehicle brake pedal at one end thereof, the other end being secured to a spring-biased locking lever which is held in a locked position by said locking lug. When the bumper is moved inwardly, the locking lug releases the locking lever and allows it to rotate under spring tension, thus causing the brake cable to apply sufficient force to operate the foot brake pedal of the vehicle braking system.

7 Claims, 9 Drawing Figures

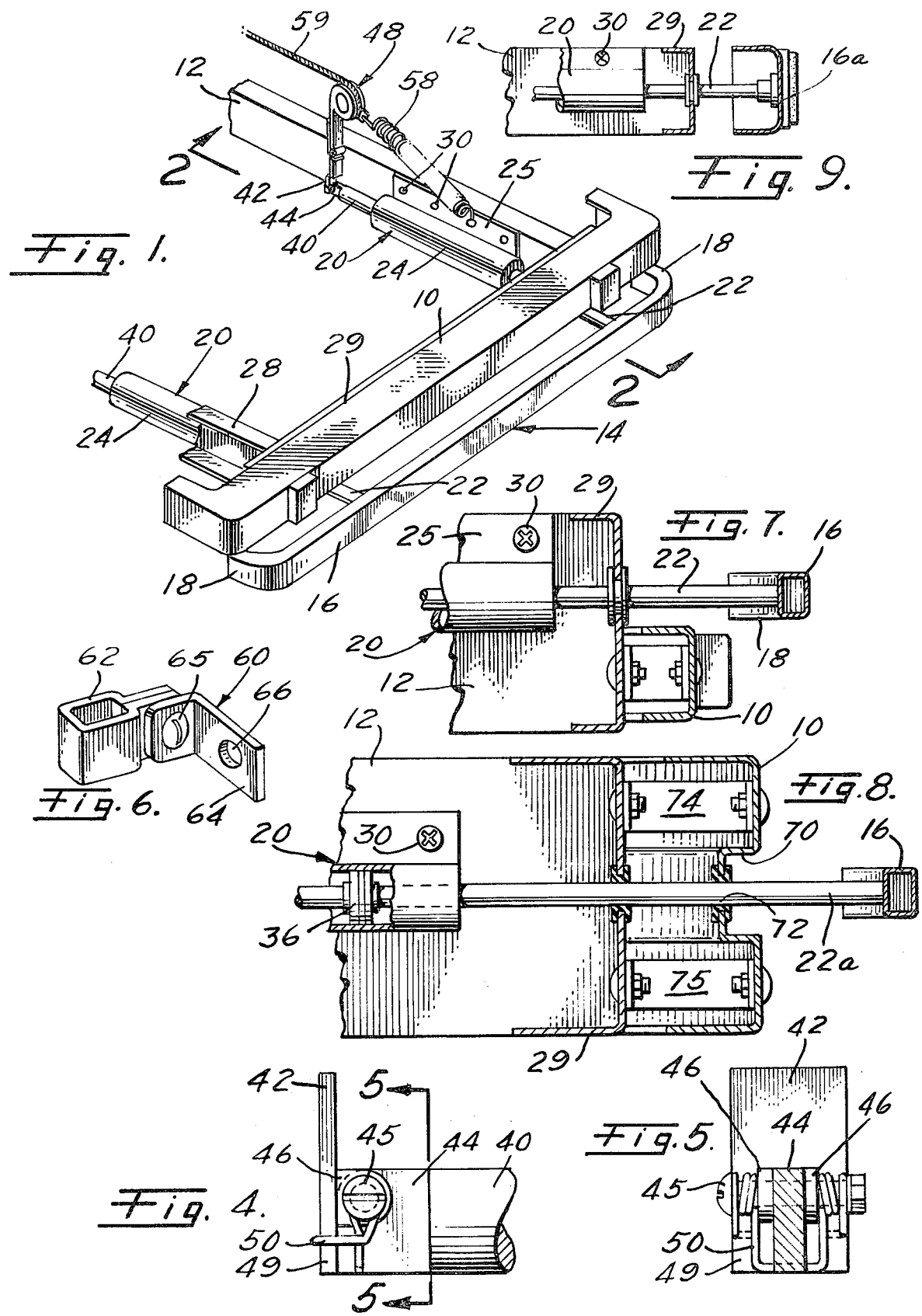

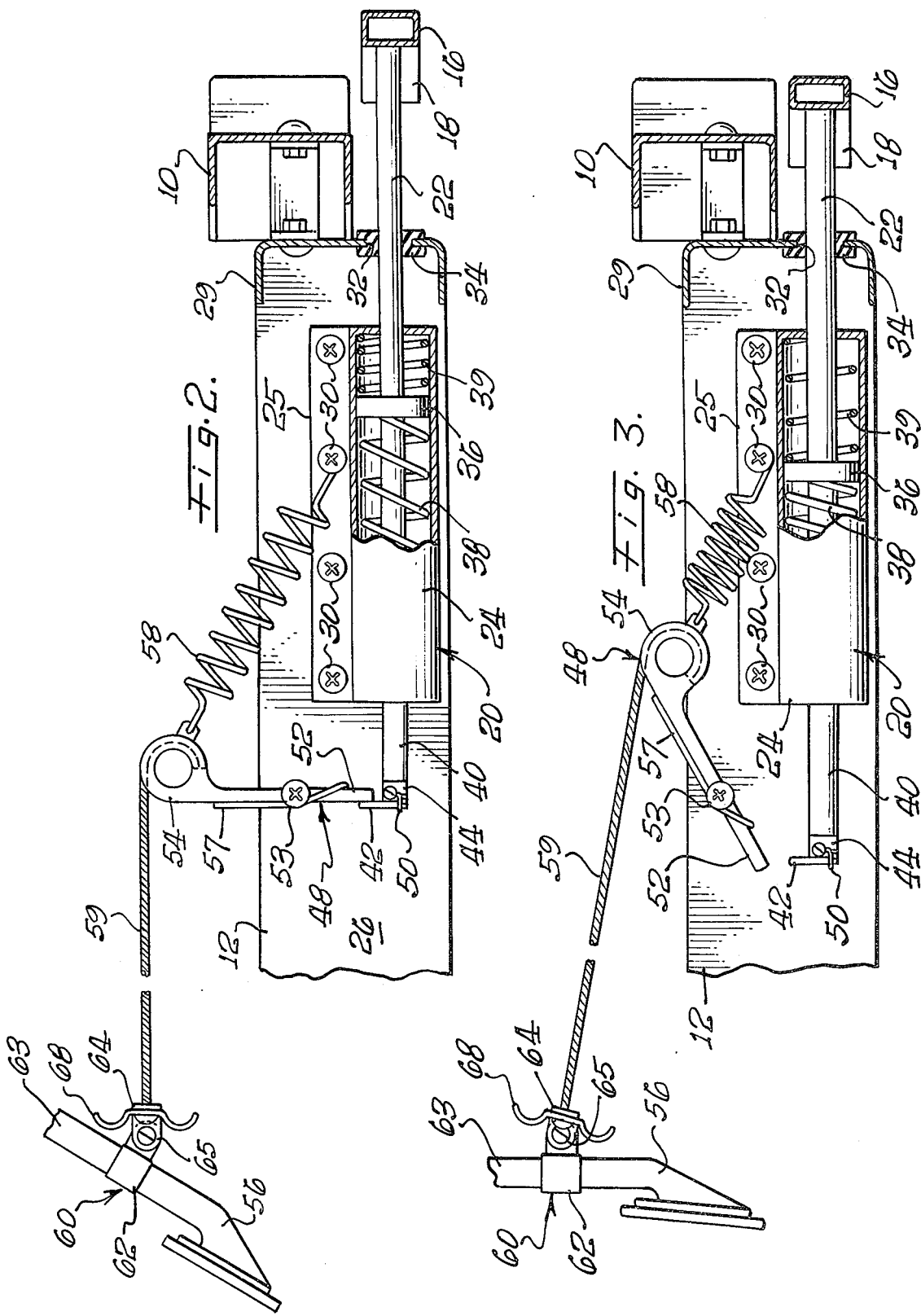

IMPACT BRAKING DEVICE

BACKGROUND

1. Field of the Invention

This invention relates generally to a braking system for motor vehicles and the like and, more particularly, to a braking device that is adapted to operate the braking system automatically upon impact of the vehicle.

2. Description of the Prior Art

As is well known in the art, various types of braking systems are presently available. However, there exists a need for these various braking systems to operate automatically without the aid of the vehicle operator. There are times when the operator of a vehicle becomes incapacitated while driving, and a very serious accident can occur due to the fact that the brakes cannot be applied by the operator. Again, many serious accidents take place when the operator of a vehicle becomes disoriented and thus loses complete control of the vehicle, and perhaps applies the gas pedal instead of the brakes. Therefore, it can be readily understood that, if a device were provided to actuate the braking system under these conditions, many lives could be saved.

SUMMARY

This invention provides an automatic braking device adapted for use with all well known vehicle braking systems, wherein the braking system is actuated automatically upon impact. This impact braking device comprises a secondary impact-absorbing bumper which extends outwardly from the front end of the vehicle just beyond that of the primary bumper found on most motor vehicles. The secondary bumper is secured to a pair of actuator means, each actuator being disposed in opposite parallel relationship to the other and secured to the frame structure of the vehicle. Each actuator is provided with a forwardly extending bar member to which the secondary bumper is secured. It should be noted that, due to the various designs of vehicles, it is contemplated that the secondary bumper may be positioned above or below the primary bumper and, in addition, it could be arranged along the longitudinal face of the primary bumper. Also, in some arrangements, the primary bumper can be adapted for use in place of the secondary bumper.

At least one of said actuators is provided with a rearwardly extending member of the actuator bar, wherein there is attached a restraining means in the form of a biased lug. This lug provides a restraining means for a locking lever which is under constant tension. Said locking lever includes an enlarged head portion, the head being adapted to receive one end of a brake cable and the opposite free end thereof is removably secured to the well known foot-brake pedal found in the conventional vehicle.

Attached to the brake pedal is a brake-cable support bracket. The brake cable is demountably received by the support bracket so that the cable can be removed therefrom when it is necessary to reset the brake device after operating same.

OBJECTS AND ADVANTAGES

The present invention has for an important object a provision whereby the conventional brake system of any type of motor vehicle can be operated automatically upon forward impact of the vehicle.

It is another object of the invention to provide an impact braking device having a secondary impact bumper which extends forward of the primary bumper, thus allowing the braking system to be actuated prior to impact with said primary bumper and diminishing the initial impact of the vehicle.

It is still another object of the invention to provide an automatic impact braking device that includes a pair of actuator means which also operate as a dual-function shock absorber.

It is a further object of the invention to provide an impact braking device that is simple and rugged in construction.

A still further object of the invention is to provide a device of this character that is easy to service and maintain.

It is still another object of this invention to provide a device of this character that is relatively inexpensive to manufacture.

It is a further object of the invention to provide a device of this character wherein the device is compatible with all vehicle braking systems, and can be readily adapted for both old and new model vehicles.

Still another object of the invention is to provide a device of this character that has relatively few operating parts.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE DRAWINGS

Referring more particularly to the accompanying drawings, which are for illustrative purposes only:

FIG. 1 is a fragmentary perspective view of the impact braking device mounted to a vehicle frame structure;

FIG. 2 is an enlarged cross-sectional view taken substantially along line 2—2 of FIG. 1, showing the device in a normal set position;

FIG. 3 is a view similar to that of FIG. 2 wherein the device is in an activated release position;

FIG. 4 is an enlarged view of the locking lug mounted to the end of the actuator bar;

FIG. 5 is a cross-sectional view taken along line 5—5 of FIG. 4, wherein the biasing spring is illustrated;

FIG. 6 is a perspective view of the cable-support bracket which is mounted to the conventional brake pedal;

FIG. 7 is a sectional view showing the secondary impact bumper positioned above the primary stationary bumper;

FIG. 8 is a sectional view illustrating the secondary bumper as being disposed adjacent the central face of the primary bumper and having the actuator bar extending therethrough; and FIG. 9 is a sectional view of another embodiment wherein the primary bumper is directly secured to the actuator.

DESCRIPTION OF THE PREFERRED EMBODIMENT

Referring to the drawings and more particularly to FIG. 1, there is shown a primary bumper 10 which represents one of the various well known bumpers now in use in most standard motor vehicles. The bumper 10 is secured to a vehicle body frame structure 12. Both the bumper 10 and body frame structure 12 are shown in a simple form for illustrative purposes only. Hence, the simplicity of the present invention lends itself to be easily adapted for installation in automobiles of various makes and designs.

Accordingly, there is shown an impact-receiving means, generally indicated at 14. Said impact-receiving means comprises a secondary impact bumper 16 positioned in this embodiment adjacent the underside of the main or primary bumper 10. Bumper 16 can be made with various designs, but is here shown as a tubular member having a rectangular cross-sectional configuration with extended, inwardly bent, trailing ends 18.

Thus, as illustrated in FIGS. 1, 2 and 3, the impact bumper 16 extends forward of the main bumper 10 to such a distance that any contact of the front end of the vehicle with another vehicle or object will be first made with the impact bumper 16. It is contemplated that the distance between said main bumper and said impact bumper will vary from 4 to 10 inches, depending on the particular design of the vehicle to which the impact device is mounted.

The impact bumper 16 is fixedly secured to a pair of oppositely disposed actuator means, generally indicated at 20, by actuator bars 22 which extend forwardly from each actuator means, as seen in FIG. 1. The actuator means comprises an elongated cylindrical housing 24 having a flange member 25 disposed along its length thereof, whereby the actuator 20 can be mounted to the inner face of the longitudinal frame members 26 and 28, respectively. These members are interconnected by a typical cross member 29, thus forming the body frame structure 12, as previously mentioned.

The housing is shown secured to said frame by a plurality of bolts 30 which are received in flange 25 of each actuator, said actuators being so positioned that the actuator bar 22 is aligned with and extends through opening 32 of the cross member 29 of the frame structure 12. In order to provide a tight fit and support for the bar 22, a grommet-type washer 34 is disposed between the opening 32 and bar 22, as seen in FIGS. 2 and 3. The actuator bar is also operably supported within the cylindrical housing 24 and is adapted with a piston head 36.

Various types of actuators are contemplated for use in this device; therefore, the actuators can either be spring loaded or hydraulically operated — similarly to the well known shock absorbers. Accordingly, said actuator 20 is shown as being spring loaded by means of springs 38 and 39 which are respectively disposed on opposite sides of said piston head 36.

The impact braking device as seen in FIG. 2 is shown in a loaded stand-by mode; that is, the impact bumper 16 is positioned forward of the main bumper 10, the springs 38 and 39 at this time providing an equal biasing force on both sides of the piston head 36.

The actuator bar 22 extends rearwardly from the housing 20, as indicated at 40, and is provided with a restraining means comprising a restraining lug 42 (See, also, enlarged FIGS. 4 and 5.) rotatably attached to the free end 40 of bar 22. The free end has been flattened, providing a mounting head 44 to which the restraining lug 42 is movably secured by bolt 45.

Lug 42 includes a pair of ear members 46 adapted to receive mounting head 44 therebetween, at which time bolt 45 passes through aligned openings provided in the ears 46 and mounting head 44. The lug 42 extends vertically upward from the head 44, thus becoming a releasable restraining means by which a locking means, indicated at 48, is held in an upright locked position. Said lug 42 also extends downwardly, as at 49, and directly abuts mounting head 44, said lug being generally held in the vertical position by a biasing means in the form of spring 50.

The locking means as seen in FIGS. 1, 2 and 3 comprises a lever arm 52 pivotally supported to the frame structure 26 by a bolt or pin 53, and having an enlarged circular ring 54 integrally formed at the upper end thereof, said ring 54 being adapted to receive a connecting means which is disposed between the lever arm 52 and the vehicle brake pedal 56.

In order to provide the required rotational movement for the lever arm 52, a biasing means is so attached as to constantly apply force in a forward direction, for rotation about pin 53. The biasing means comprises a lever spring 57 mounted at the pivot point of the lever arm 52. In addition, with the various braking systems, a second spring 58 can be added — as seen attached to the lever ring 54 at one end thereof and at the opposite end to one of the actuator-mounting bolts 30.

The connecting means between the brake pedal 56 of a motor vehicle and the lever arm 52 comprises a length of cable 59 adapted at one end thereof to be fixedly received in ring 54 of lever arm 52 and at the opposite end of the cable 59 to the cable-support bracket, generally indicated at 60. Said cable is thus held in constant tension due to the normal biasing force inherent in a brake pedal and the opposite biasing force applied to the lever arm. However, the cable is slidably mounted to the bracket.

The support bracket 60 comprises a clamp 62, which is secured to the brake pedal arm 63, and includes a horizontally extending leg 64, said leg 64 being movably attached to the bracket 62 by a bolt 65. A hole 66 is provided in the leg 64 to allow the cable 59 to be received therethrough and slidably mounted thereon. The cable passes through hole 66, at which time a handle 68 is secured to the free end of the cable, thereby attaching the cable to the support bracket — yet allowing free movement of the cable by hand when necessary.

OPERATION

Referring now to FIGS. 2 and 3, in FIG. 2 the impact braking device is illustrated in an operable mode, and in FIG. 3 the device is shown after impact with the front end of a vehicle, represented by frame structure 12.

Accordingly, in FIG. 2 the impact bumper 16 is shown positioned extending outwardly from the beam structure 29 and the main vehicle bumper 10. This is considered the normal position for the impact bumper 16 because the actuator 20 provides an equalizing force along the actuator bar 22. Thus, whenever the impact bumper is moved, it will always return to this position automatically.

As mentioned before, there is provided a restraining lug 42 operably attached to the opposite free end of the actuator bar 22. This is held in a vertical position by spring 50, whereby lever arm 52 is latched in a vertical position and held from rotation due to the biasing forces of springs 57 and 58. With the lever arm in this position, the foot-brake pedal is allowed to operate in its normal manner, without affecting the impact braking device. This is due to the slidable connection between the cable support bracket 60 and the cable 59.

Accordingly, as the impact bumper makes contact with an obstruction within a range of from 5 to 15 miles per hour, the bumper 16 will retract, as seen in FIG. 3 — causing the actuator to react and thus moving the restraining lug 42 rearward and releasing the locking lever 52, wherein the force of springs 57 and 58 causes the lever to rotate clockwise. Hence, this effects a pulling reaction on cable 59, automatically moving the foot-brake pedal to a depressed braking position and thereby causing the vehicle brake system to operate. It should be noted that the vehicle brake system is well understood in the art and, therefore, not shown herein.

Once contact with the impact bumper 16 is relieved, the actuators return the bumper 16 to its normal position. However, the brakes of the vehicle are still held in a locked mode. Thus, in order to release the brake pedal and unlock the vehicle brake system, handle 68 of the cable 59 is pulled so that the lever arm 52 is vertically positioned once again, as seen in FIGS. 1 and 2. As the lever is returned to a restrained position, its lower end engages lug 42, thus rotating it forwardly against the force of spring 50 — and permitting lever 52 to pass over the lug, at which point lug 42 snaps back to its restraining position and the lever is once again locked into a normal operating mode.

ADDITIONAL EMBODIMENTS

Referring now to FIGS. 7, 8 and 9, three different arrangements are contemplated. First, in FIG. 7, the position of the impact bumper 16 is disposed above the primary or main bumper 10. The remaining impact braking device is identical to that as heretofore described.

FIG. 8 also operates as previously described except that the position of the impact bumper 16 is aligned with the central longitudinal area of the main bumper 10. In this arrangement, the bumper 10 is provided with a longitudinal channel 70 having an opening 72 therein to receive the extended actuator bar 22a. The main bumper 10 can be supported in any suitable manner but is shown as having two support brackets 74 and 75 secured to the frame structure 29.

In the arrangement as illustrated in FIG. 9, the main bumper is illuminated and the size of the impact bumper 16a is enlarged to provide full protection for the vehicle.

The invention and its attendant advantages will be understood from the foregoing description; and it will be apparent that various changes may be made in the form, construction and arrangement of the parts of the invention without departing from the spirit and scope thereof, or sacrificing its material advantages, the arrangements hereinbefore described being merely by way of example; and I do not wish to be restricted to the specific forms shown or uses mentioned, except as defined in the accompanying claims.

I claim:

1. An automatic impact braking device, for use in combination with a motor vehicle brake system, having a foot brake pedal, the automatic impact braking device comprising:

an actuator means secured to said vehicle, wherein said actuator means comprises a pair of oppositely disposed actuators having an actuator arm extending forwardly and rearwardly of said actuator;
   an impact-receiving means secured to one end of said actuator means, wherein said impact-receiving means comprises an impact bumper, said bumper being extended forwardly of said vehicle;
   a restraining means operably mounted to the opposite end of said actuator means, wherein said restraining means comprises: a removable restraining lug pivotally mounted to said rearward portion of said actuator bar; and a spring-biasing means attached to said lug, whereby said lug is held in a vertical restraining model;
   a locking means adapted to be releasably held by said restraining means and operably mounted to said vehicle;
   a pivoting means attached to said locking means whereby said locking means is allowed to pivot when disengaged from said restraining means; and
   a connecting means secured at one end to said locking means, the opposite end thereof being mounted to said foot-brake pedal of said vehicle.

2. An automatic impact braking device as recited in claim 1, wherein said locking means comprises;

a locking-lever arm having an enlarged circular ring integrally formed thereon;
   a pivoting means whereby said lever arm is rotatably secured to said vehicle adjacent the restraining lug for direct engagement therewith; and
   biasing means attached to said lever arm for imparting rotational movement thereto when disengaged with said restraining lug.

3. An automatic impact braking device as recited in claim 2, wherein said connecting means comprises a brake cable having one end thereof secured to said ring of said locking lever arm, and the opposite free end thereof slidably attached to said foot-brake pedal.

4. An automatic impact braking device as recited in claim 3, wherein the device includes:

a cable-support bracket secured to said foot-brake pedal and having a movable extending leg to which the cable is slidably attached; and
   a handle secured to the free end of said cable.

5. An automatic impact braking device as recited in claim 4, wherein the motor vehicle also includes a main forward bumper; and wherein said impact bumper is positioned below and forward of said main bumper.

6. An automatic impact braking device as recited in claim 4, wherein the motor vehicle also includes a main forward bumper; and wherein said impact bumper is positioned above and forward of said main bumper.

7. An automatic impact braking device as recited in claim 4, wherein the motor vehicle also includes a main forward bumper having a centrally disposed longitudinal channel therein; and wherein said impact bumper is positioned adjacent and forward of said longitudinal channel.

* * * * *